United States Patent
Odaohara

[11] Patent Number: 5,784,626
[45] Date of Patent: Jul. 21, 1998

[54] BATTERY CONNECTING DEVICE FOR A COMPUTER SYSTEM AND A METHOD OF SWITCHING BATTERIES

[75] Inventor: Shigefumi Odaohara, Yamato, Japan

[73] Assignee: International Business Machines, Armonk, N.Y.

[21] Appl. No.: 507,694

[22] Filed: Jul. 26, 1995

[30] Foreign Application Priority Data

Jul. 26, 1994 [JP] Japan .................................. 6-174387

[51] Int. Cl.$^6$ .................................. H02J 7/00; G06F 1/26
[52] U.S. Cl. .................................. 395/750.01; 395/750.08; 307/66; 320/14; 320/15
[58] Field of Search .................................. 395/750, 750.01, 395/750.08; 307/66; 320/14, 15, 2, 22, 31, 48

[56] References Cited

U.S. PATENT DOCUMENTS

| | | |
|---|---|---|
| 4,079,303 | 3/1978 | Cox . |
| 4,163,935 | 8/1979 | Sakurada et al. . |
| 4,914,469 | 4/1990 | Ishimura et al. . |
| 5,057,779 | 10/1991 | Mittel . |
| 5,243,269 | 9/1993 | Katayama et al. . |
| 5,300,874 | 4/1994 | Shimamoto et al. . |
| 5,448,719 | 9/1995 | Schultz et al. . |

FOREIGN PATENT DOCUMENTS

| | | |
|---|---|---|
| 02019911 | 1/1990 | Japan . |
| 06197468 | 7/1994 | Japan . |

*Primary Examiner*—Ayaz R. Sheikh
*Assistant Examiner*—Rupal D. Dharia
*Attorney, Agent, or Firm*—Andrew J. Dillon

[57] ABSTRACT

Two batteries can be selectively coupled to a computer, each through a separate pair of serially coupled transistors. Each of the four transistors is shunted by a diode, and each transistor can be individually controlled by a control circuit. To couple one of the batteries to the computer, the control circuit activates one pair of transistors, such that the battery current flows through the transistors and not through the diodes, thereby avoiding any power loss that would occur in the diodes. When switching from one battery to the other, the control circuit enters an intermediate mode in which one transistor in each of the two pairs of transistors is switched OFF, such that both batteries are momentarily "OR" coupled to the computer through two of the diodes, thereby preventing a momentary loss of power during the switching operation. A door covers both batteries such that neither battery can be removed except when the door is open. A door switch sends a signal to the control circuit that indicates door position. When the door is open, the control circuit "OR" couples both batteries to the computer through two of the diodes, thereby permitting either battery to be removed without interrupting power to the computer.

3 Claims, 20 Drawing Sheets

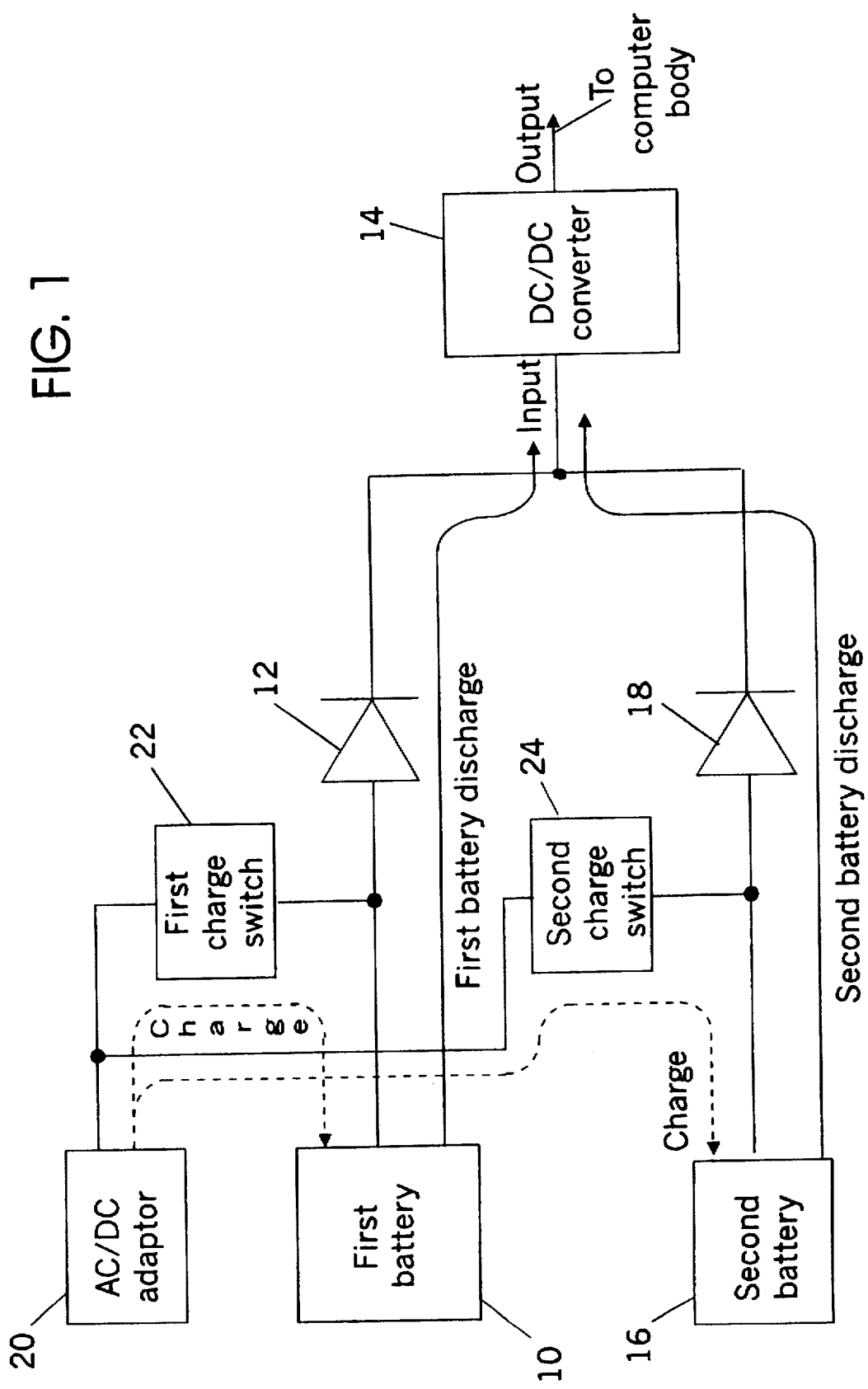

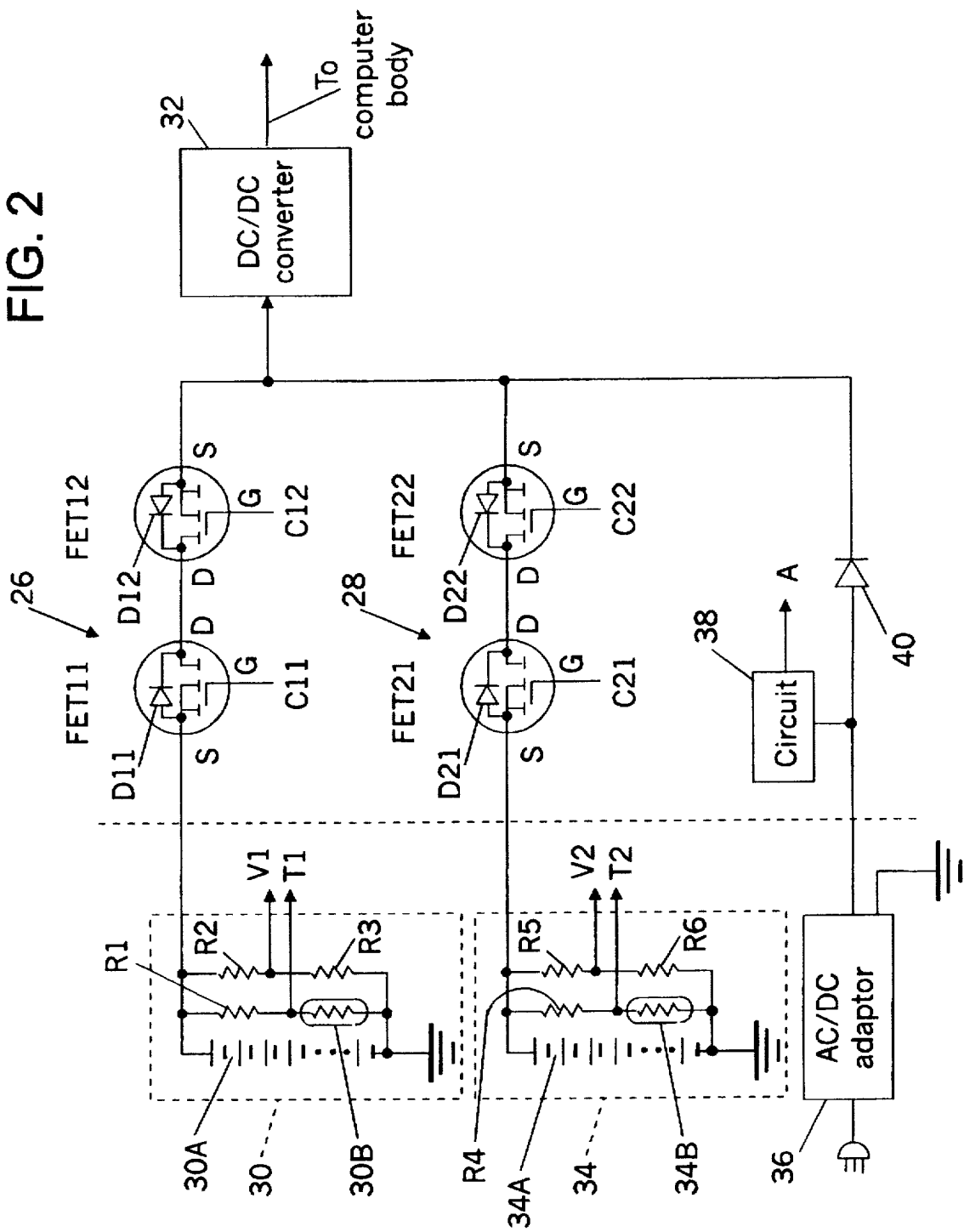

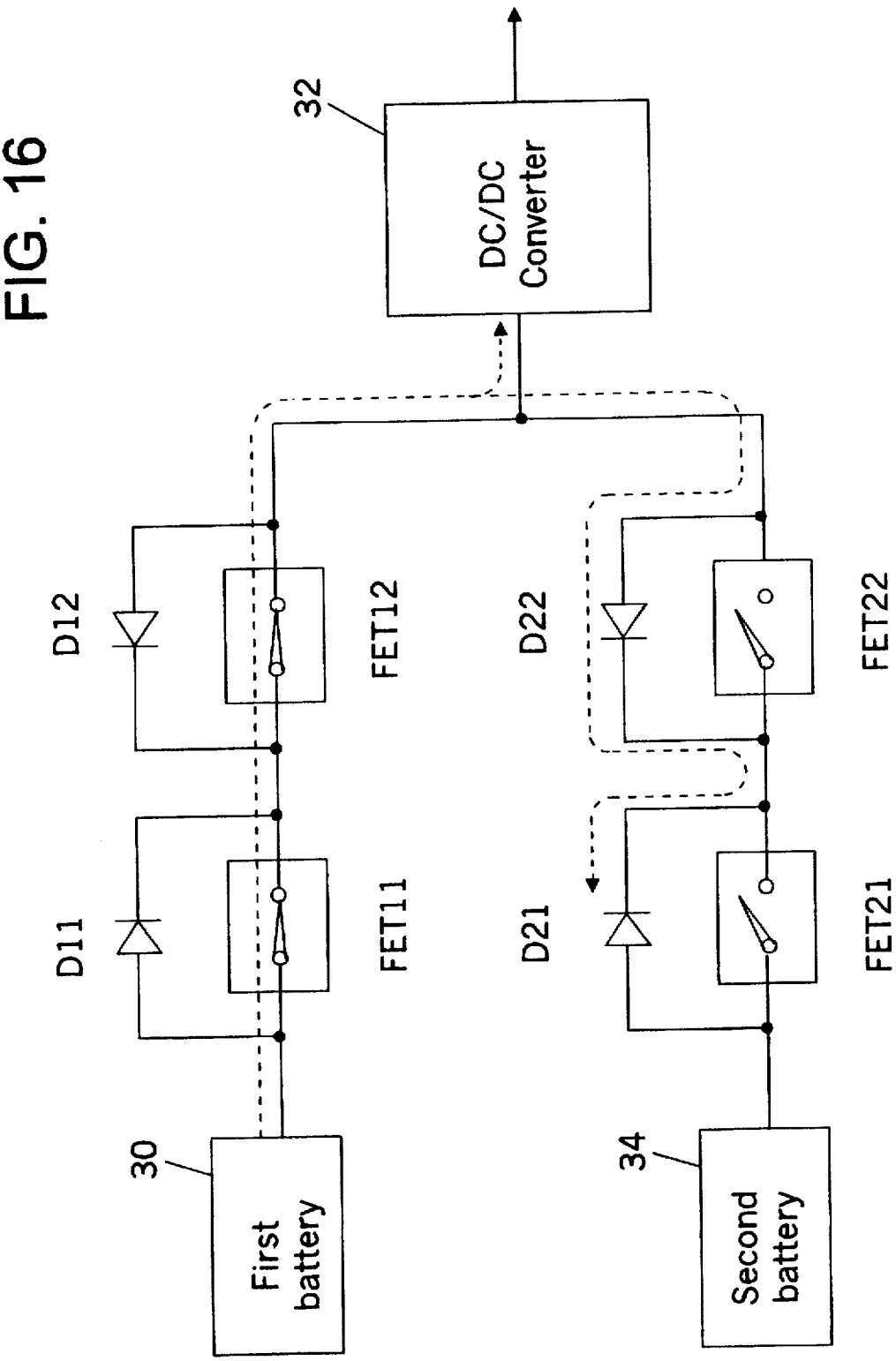

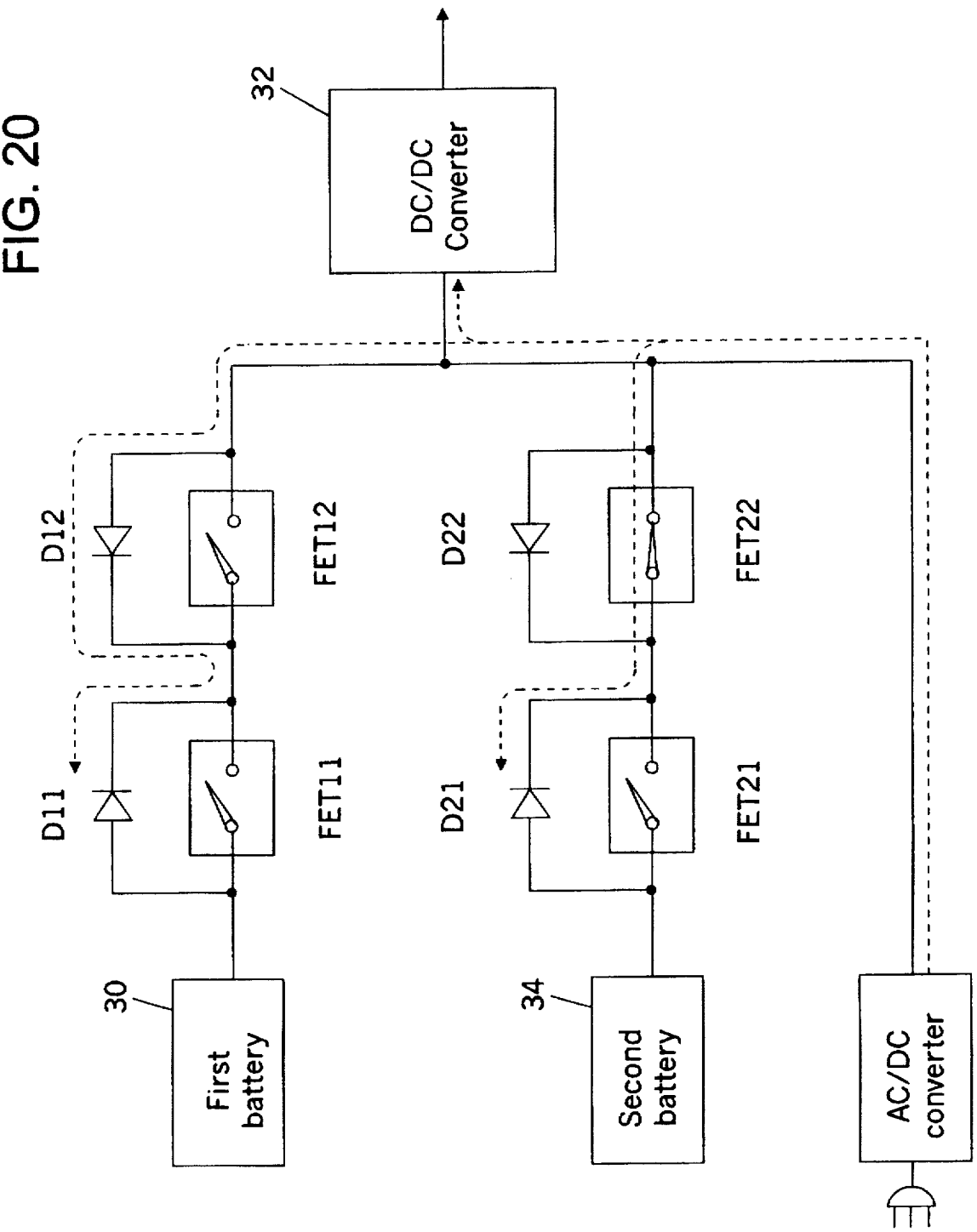

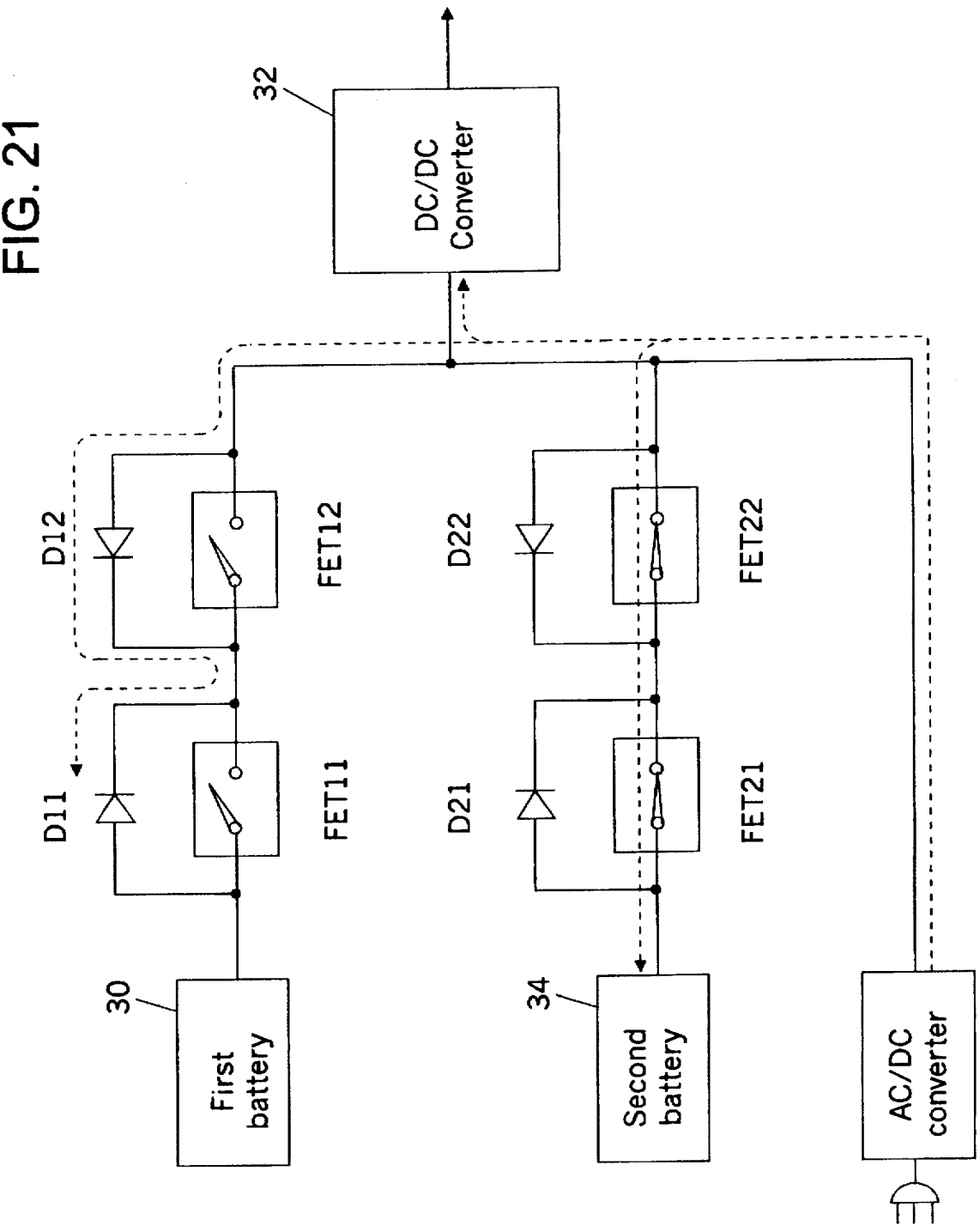

5,784,626

1

BATTERY CONNECTING DEVICE FOR A COMPUTER SYSTEM AND A METHOD OF SWITCHING BATTERIES

BACKGROUND of the INVENTION

Applicant claims the foreign priority benefits of 35 U.S.C. 119 of Japanese App. No. 6-174-387, which was filed Jul. 26, 1994, the translation of which is incorporated by reference into this application.

The present invention relates to a battery connecting device for a computer system and a method for switching batteries, and more particularly, to a battery connecting device, for a computer system, that prevents the power loss that results from the use of a diode and extends a battery operational period, and a method for switching batteries.

In general, a notebook computer incorporates a battery pack (hereafter referred to as a "battery"), and a user employs the battery to operate the computer in those places where an AC power supply is not available. For a notebook computer that has a color liquid crystal display, a fully charged battery will usually operate it for about three hours. The three hours of operation that a fully charged battery may provide, however, are not always sufficient for a user.

A notebook computer in which two batteries are mounted has therefore been proposed.

FIG. 1 is a diagram illustrating a battery connecting device, for a notebook computer in which two batteries are mounted, on which the present invention is based. A first battery 10 is connected via a diode 12, which is positioned in the forward direction, to the input terminal of a DC/DC converter 14 that supplies power to a computer. A second battery 16 is connected to the input terminal of the DC/DC converter 14 via a diode 18, which is also positioned in the forward direction. The first battery 10 and the second battery 16 are OR-connected via the diodes 12 and 18 to the DC/DC converter 14. The diode-OR connection prevents the occurrence, because there is a difference in the potentials of the first and second batteries 10 and 16, of a phenomenon wherein a large current flows between the first and the second batteries 10 and 16 and damages the components that are located between the batteries 10 and 16, a wiring pattern, or the batteries 10 and 16 themselves.

With the above described connection that is employed with two batteries, power from either the first battery 10 or the second battery 16 is supplied to the computer body via the diode 12 or the diode 18 and the DC/DC converter 14.

An AC/DC adaptor 20 that converts an AC input into a DC output is connected between the first battery 10 and the diode 12 via a first charge switch 22, and is further connected between the second battery 16 and the diode 18 via a second charge switch 24, thus providing charging routes in addition to a power supply route along which power is supplied to a computer body via the DC/DC converter 14. Either the first battery 10 or the second battery 16 can be charged along the charging routes, and power can be supplied to a computer body via either the diode 12 or the diode 18 and the DC/DC converter 14.

In a conventional battery connecting device for a computer system, however, the power that is supplied by a battery transits a diode, and the power loss that results from the use of the diode is not negligible. For example, supposing that the capacity of one battery is 30 WH (60 WH for two batteries), a battery voltage is 10.6 V, a diode Vf is 0.6 V, and the consumed power of a computer body is 10 W, a current that flows across the diode is 10/(10.6−0.6)=1 [A], and the

2 battery operational period is 60 WH/(10 W+0.6 W×1 A)=5.66 hours.

Further, since charging routes in addition to a power supply route are provided, the structure becomes complicated.

SUMMARY OF THE INVENTION

To overcome the above shortcomings, it is an object of the present invention to provide a battery connecting device, for a computer system, that can eliminate the power loss that is occasioned by a diode and that can extend the battery operational period, and a method for switching batteries.

It is another object of the present invention to provide a battery connecting device, for a computer system, that has a structure that is simplified by the employment of a common route for supplying power and charging.

To achieve the above objects, a battery connecting device for a computer system, according to claim 1 of the present invention, comprises: a plurality of series circuits, each of which includes a first circuit and a second circuit, and with the first circuit having a first switching element, which is connectable to a battery at an input terminal, and a first diode, which has an anode connected to the input terminal of the first switching element and a cathode connected to the output terminal of the first switching element, and with the second circuit having a second switching element, which has an input terminal connected to the output terminal of the first switching element and an output terminal connected to a computer body to supply power, and a second diode, which has a cathode connected to the input terminal of the second switching element and an anode connected to the output terminal of the second switching element.

BRIEF DESCRIPTION OF THE DRAWINGS

FIG. 1 is a circuit diagram illustrating a conventional battery connecting device for a computer system.

FIG. 2 is a circuit diagram illustrating a conventional battery connecting device for a computer system according to one embodiment of the present invention.

FIG. 16 is a specific diagram showing how power is supplied from the first battery.

FIG. 20 is a specific diagram showing that an FET 12 is turned off in the circuit shown in FIG. 19.

FIG. 21 is a specific diagram showing that an FET 21 is turned off in the circuit shown in FIG. 20.

DESCRIPTION OF THE PREFERRED EMBODIMENTS

Figure 22:
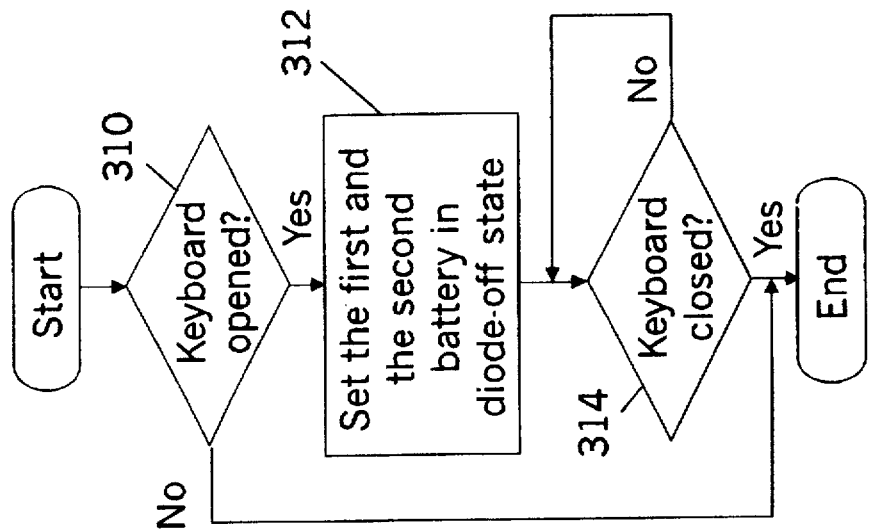
FIG. 22 is a detailed flowchart for the procedure at step 300 in FIG. 5.

One embodiment of the present invention will now be described in detail while referring to the accompanying drawings. As shown in FIG. 2, a battery connecting device for a computer system in this embodiment comprises a first series circuit 26 and a second series circuit 28. The first series circuit 26 includes field-effect transistors (each of which will hereafter be referred to as an "FET") 11 and 12 that have their drains D connected together. A power MOSFET can be used instead of an FET. The second series circuit 28, as well as the first series circuit 26, includes FETs 21 and 22 that have their drains D connected together.

The FETs 11, 12, 21, and 22 incorporate internal diodes D11, D12, D21, D22, respectively, that have their cathodes connected to the respective drains D and their anodes connected to the respective sources S.

A battery pack (battery) storage space, which employs as a cover a keyboard that is freely opened and closed, may be provided in a notebook computer body for this embodiment. The source S of the FET 11 is connected to a first battery pack 30, which is so loaded that it is removable from the battery pack storage unit within the computer body. The source S of the FET 12 is connected to the input terminal of a DC/DC converter 32, which supplies power to the computer body. A keyboard switch for detecting the open/closed state of the keyboard is also provided in the computer body. The source S of the FET 21 is connected to a second battery pack 34, which is so loaded that it is removable from the notebook computer body. The source S of the FET 22 is connected to the input terminal of the DC/DC converter 32.

When the keyboard is opened and either of the first battery pack 30 or the second battery pack 34 is removed from the computer body, the electrical connections of the first series circuit 26 to the first battery pack 30 or of the second series circuit 28 to the second battery pack 34 are released. In other words, the first battery pack 30 and the first series circuit 26, and the second battery pack 34 and the second series circuit 28 are so connected that they can be separated.

In the first battery pack 30 are provided a first battery cell 30A, resistors R1, R2, and R3, and a thermistor 30B that monitors the temperature of the first battery cell 30A, i.e., the temperature of the first battery pack 30. A battery temperature T1 is obtained by monitoring the voltage between the resistor R1 and the thermistor 30B, and a battery voltage V1 is read by monitoring the voltage between the resistors R2 and R3. NiMH, etc., can be used as a battery cell.

The arrangement of the second battery pack 34 is identical to that of the first battery pack 30. Provided in the second battery pack 34 are a second battery cell 34A, resistors R4, R5, and R6, and a thermistor 34B that detects the temperature of the second battery cell 34A, i.e., the temperature of the second battery pack 34. As is described for the first battery pack 30, a battery temperature T2 and a battery voltage V2 are respectively obtained by monitoring the voltage between the resistor R4 and the thermistor 34B and the voltage between the resistors R5 and R6.

An AC/DC adaptor 36 that converts an AC (alternate current) into a DC (direct current) is connected to the input terminal of the DC/DC converter 32 via a connector (not shown), which is provided on the side of the computer body, and a diode 40, which is incorporated in the computer body. The AC/DC adaptor 36 can be removed from the computer body by detaching it from the connector.

The anode of the diode 40 is connected to a detection circuit 38 that ascertains whether or not the AC/DC adaptor 36 is connected. When the AC/DC adaptor 36 is connected to the computer system, the detection circuit 38 outputs a high level signal A. When the AC/DC adaptor is removed from the computer system, the detection circuit 38 outputs a low level signal A.

Figure 3:
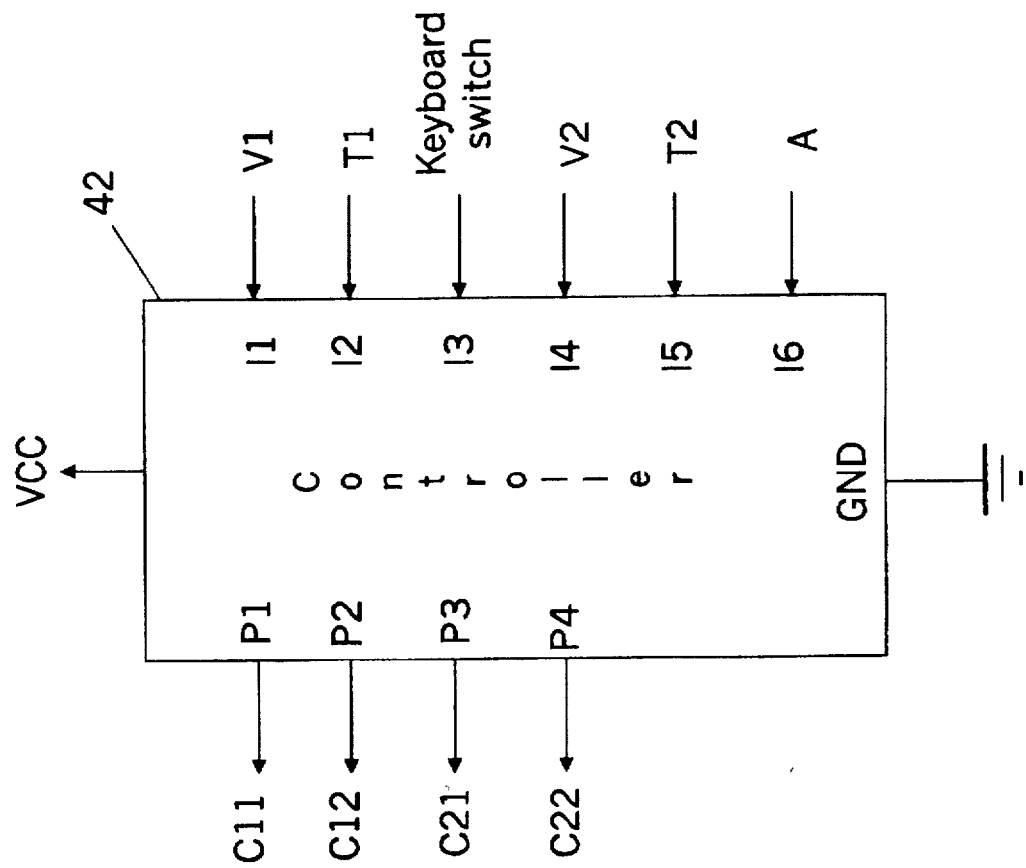
FIG. 3 is a block diagram illustrating a controller that controls the ON/OFF state of an FET in FIG. 2.

FIG. 3 is a diagram showing a controller 42 that controls the switching of the FETs 11 through 22. Output pins P1, P2, P3 and P4 are connected to the gates G of the individual FETs to input control signals C11, C12, C21, and C22, respectively. Input pins I1 and I2 are so connected that, respectively, they receive the battery voltage V1 and the battery temperature T1. Input pins I4 and I5 are so connected that, respectively, they receive the battery voltage V2 and the battery temperature T2. An input pin I3 is connected to the keyboard switch that serves as a detection means and detects a previous notice for battery removal, and an input pin I6 is so connected that it receives the signal A from the detection circuit 38. The keyboard switch is turned on or off in response to the open or closed state of the keyboard. When a cover other than the keyboard is employed as a cover of the battery storage unit, a switch that is turned on or off in response to the opening or closing the cover may be used instead of the keyboard switch. The controller 42 is connected to a DC power source VCC, and a GND pin is grounded.

Figure 4:
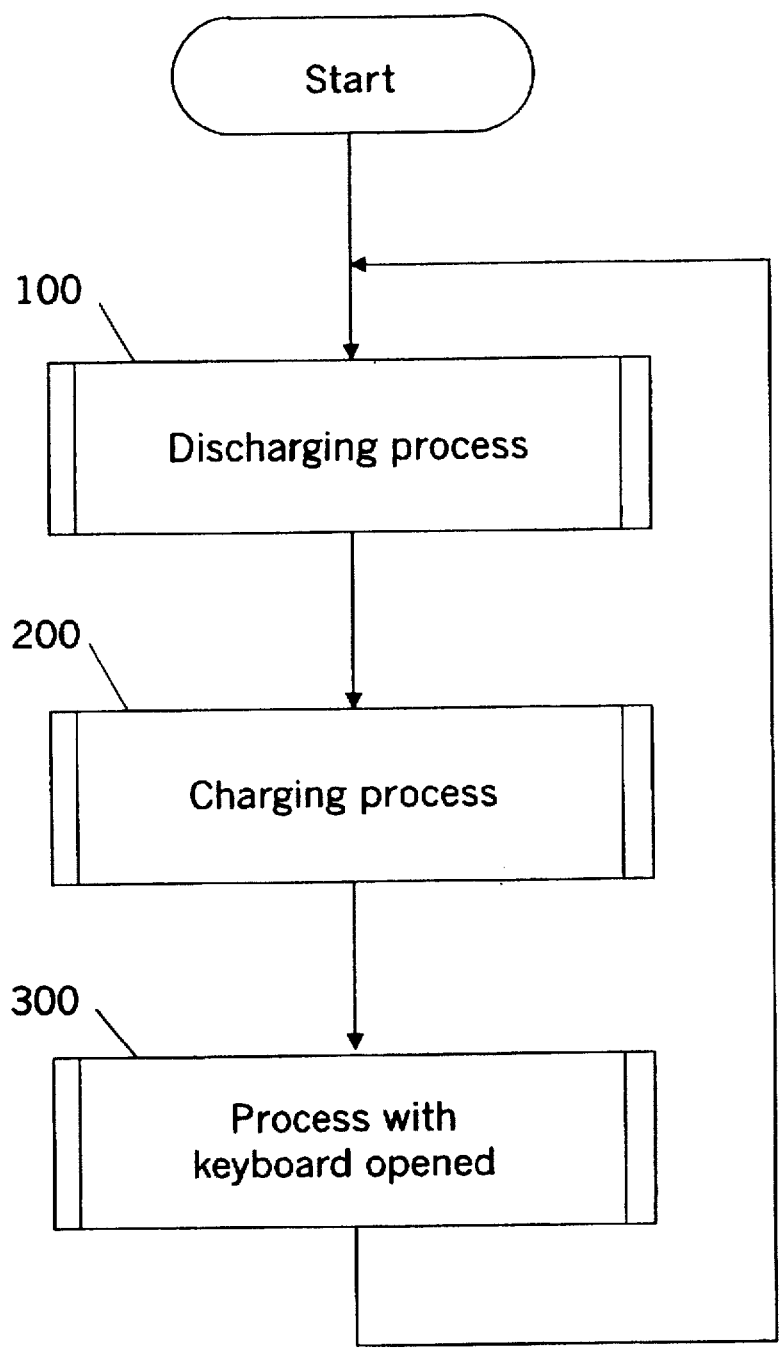
FIG. 4 is a flowchart showing the charging and discharging routine for this embodiment.

FIG. 4 is a flowchart showing the control routine for this embodiment. At step 100, a discharging process for a battery pack is performed to supply power from the battery pack to a computer body. At step 200, a charging process for the battery pack is performed, and at step 300, a process that is initiated when a keyboard is opened, i.e., a process for giving a previous notice that a battery is to be removed, is performed.

Figure 5:
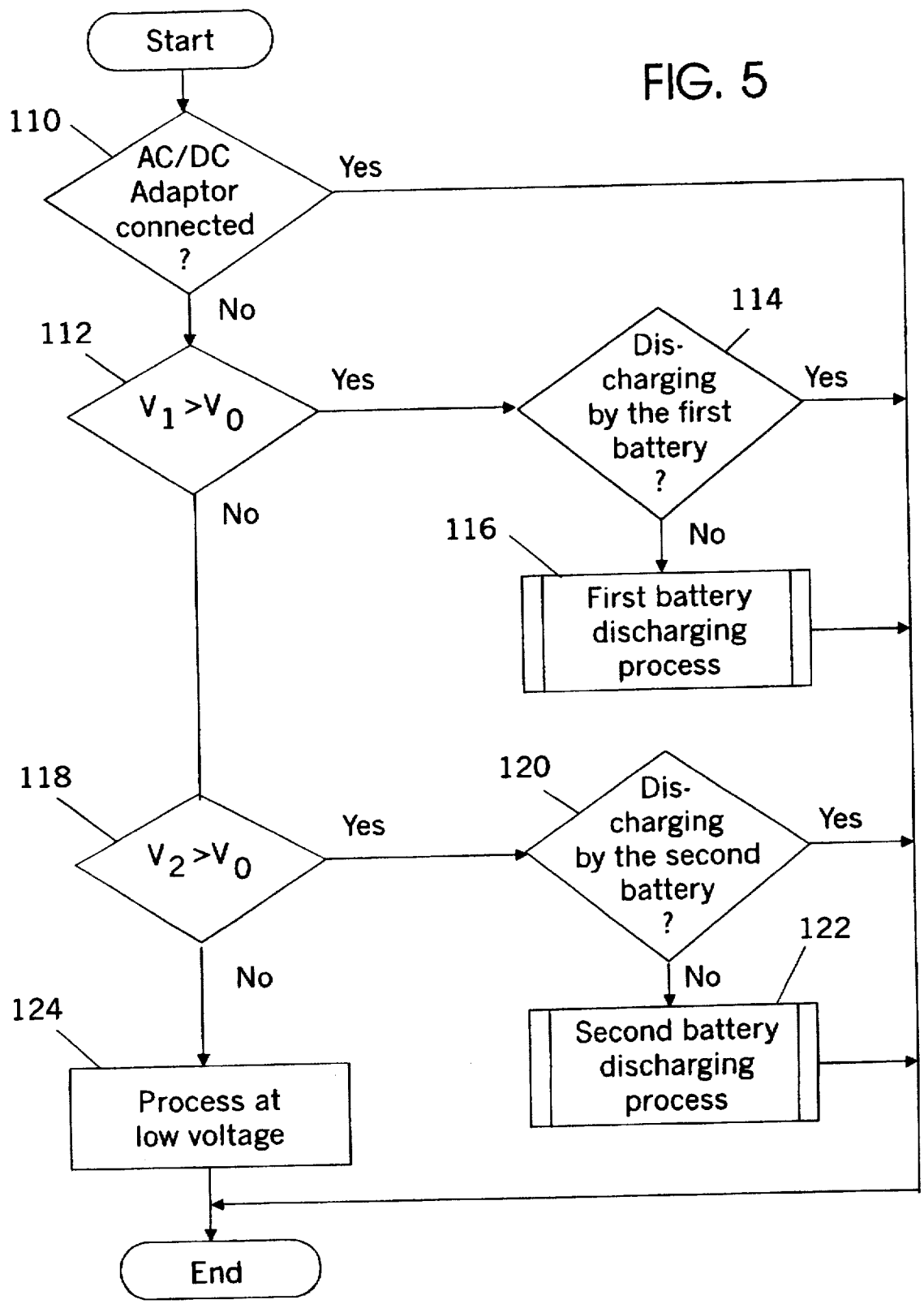
FIG. 5 is a detailed flowchart for the procedure at step 100 in FIG. 4.

FIG. 5 is a detailed flowchart showing the discharging process for a battery pack at step 10. At step 110, a check is performed to determine whether or not the AC/DC adaptor 36 is connected to the computer system. When the AC/DC adaptor 36 is so connected, either a charging process is to be performed, or the computer is being powered by the AC/DC adaptor. The routine is thereafter terminated.

When, at step 110, the AC/DC adaptor 36 is not so connected, one of the batteries is discharged, a procedure which will be described later, and when the capacity of this battery falls to or below a predetermined value, the other battery will be discharged.

First, at step 112, a check is performed to determine whether or not the battery voltage V1 of the first battery pack 30 is greater than a reference voltage V0, which is equivalent to the operation halt voltage for a battery. The reference voltage V0 is employed to halt the battery discharging when the battery voltage V1 is reduced to the reference voltage V0 or lower. When the battery voltage V1 is greater than the reference voltage V0, the discharging is enabled. At step 114, therefore, a check is performed to determine whether or not the first battery pack 30 is being discharged. When the first battery pack 30 is being discharged, the routine is terminated. When the first battery pack 30 has not been discharged, at step 116, the discharge of the first battery pack 30 is initiated, as will be described later.

When the battery voltage V1 of the first battery pack 30 is the reference voltage V0 or below, i.e., when the normal discharging of the first battery pack 30 cannot be performed, a check is then performed at step 118 to determine whether or not the battery voltage V2 of the second battery pack 34 is greater than the reference voltage V0. If the battery voltage V2 is greater than the reference voltage V0, at step 120 a check is performed to determine whether or not the second battery pack 34 is being discharged. If the second battery pack 34 is being discharged, the routine is terminated. If the second battery pack 34 is not being discharged, at step 122 the discharge of the second battery pack 34 is initiated, as will be described later.

When, at step 118, the battery voltage V2 is equal to or lower than the reference voltage V0, i.e., when the normal discharge of the first battery pack 30 and the second battery pack 34 cannot be performed, it is assumed that the capacities of both batteries are equal to or lower than a predetermined value. An LED is switched on to indicate the remaining battery capacities are low and the computer is powered down and set to the suspended state. While the computer is in the suspended state, power is supplied to electronic components, such as a memory and a memory controller, for which the supply of power is a requisite, but no power is supplied to a display, etc., for which the supply of power is not a requisite.

Figure 6:
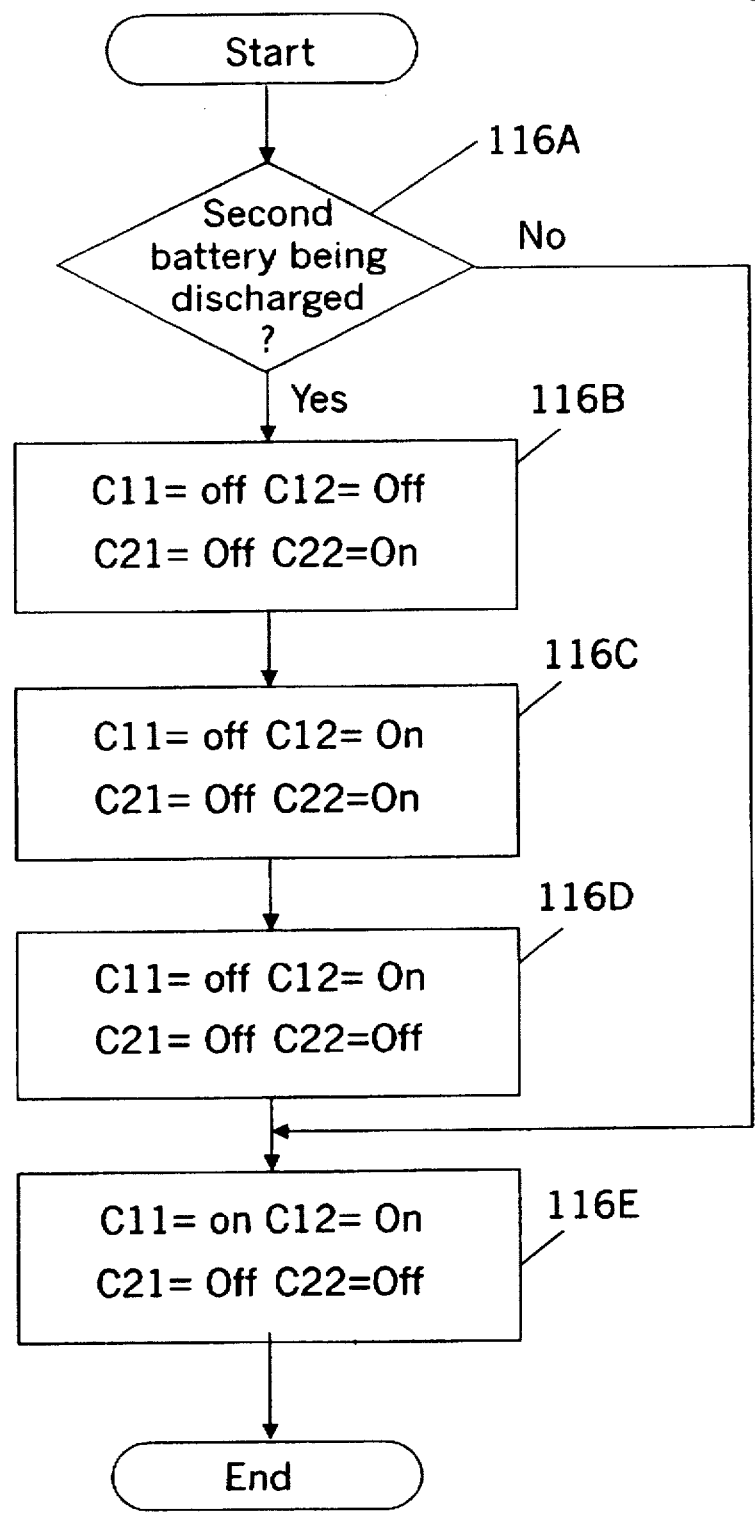
FIG. 6 is a detailed flowchart for the procedure at step 116 in FIG. 5.
Figure 8:
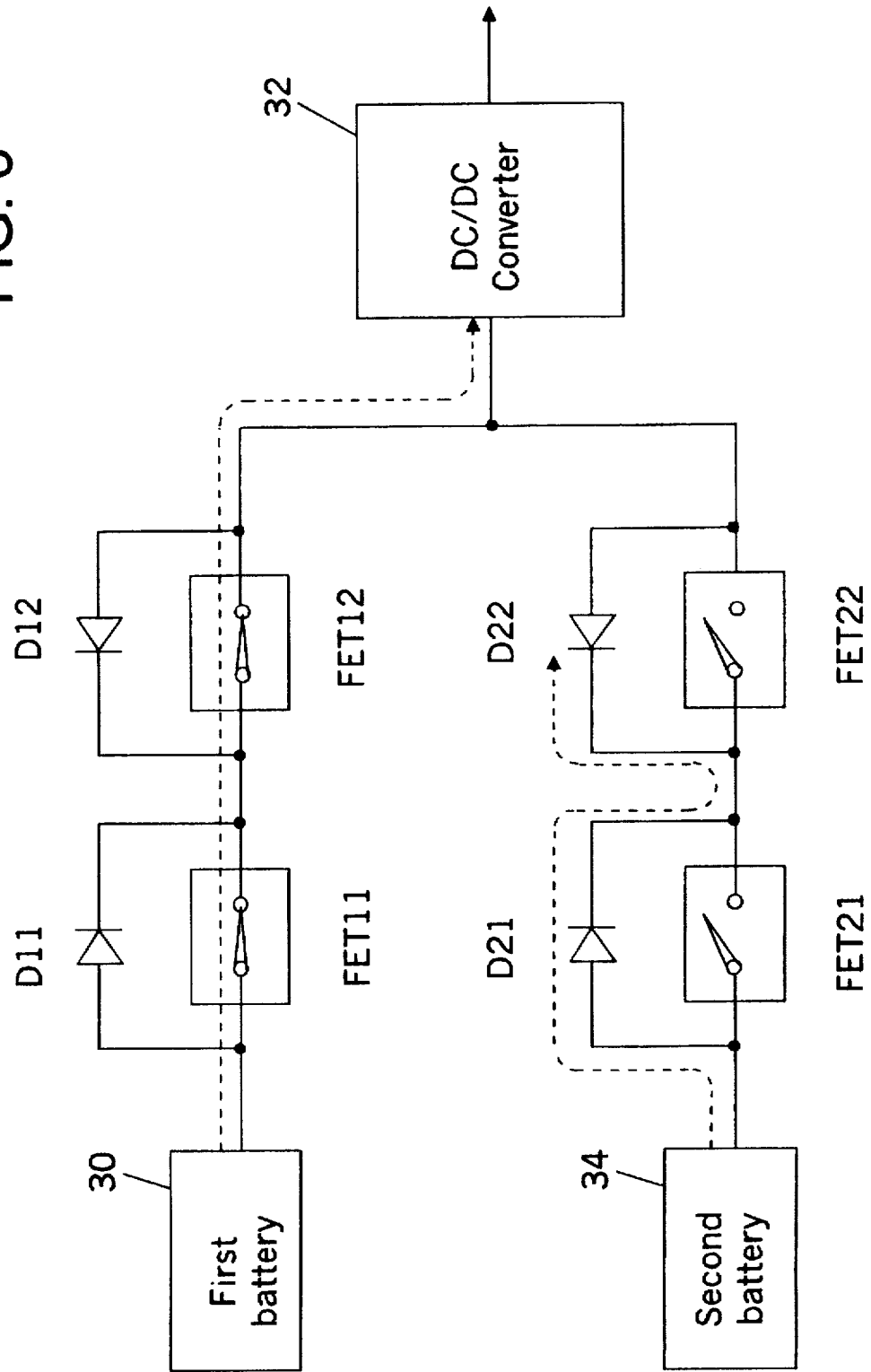
FIG. 8 is a specific diagram showing how power is supplied from a first battery.
Figure 9:
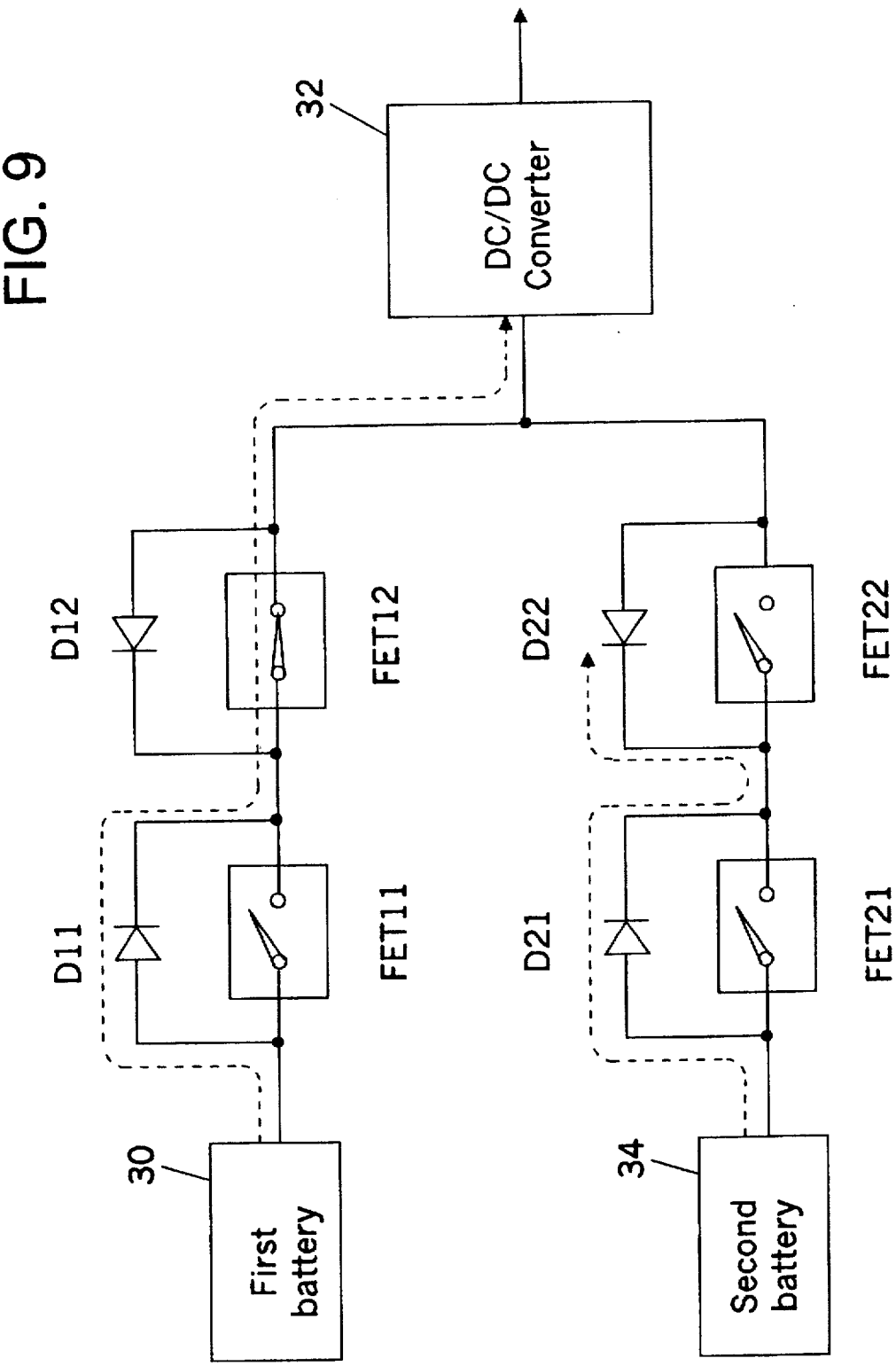
FIG. 9 is a specific diagram showing how power is supplied via an internal diode D11.

FIG. 6 is a detailed flowchart for the procedure at step 116. At step 116A, a check is performed to determine whether or not the second battery pack 34 is being discharged. If the second battery pack 34 is not being discharged, it is assumed that the second battery pack 34 is not in use while the first battery pack 30 is in use. At step 116E, therefore, the controller 42 outputs control signals C11, C12, C21, and C22 for turning on the FETs 11 and 12 and for turning off the FETs 21 and 22 (FIG. 8). Then, the discharge of the first battery pack 30 is performed to supply power to the computer body. Since electric power from the first battery pack 30 is supplied without the internal diodes D11 and D12, the power loss that results from the use of the diodes does not occur. Although power is supplied via the FETs in this case, compared with power that is lost when the internal diodes are in use, the power loss due to the resistance in the FETs is so low that it can be disregarded. The supply of power from the second battery pack 34 is stopped by the diode D22 (when V2>V1, as is shown in FIG. 8) or by the diode D21 (V1>V2, as is shown in FIG. 16).

Figure 11:
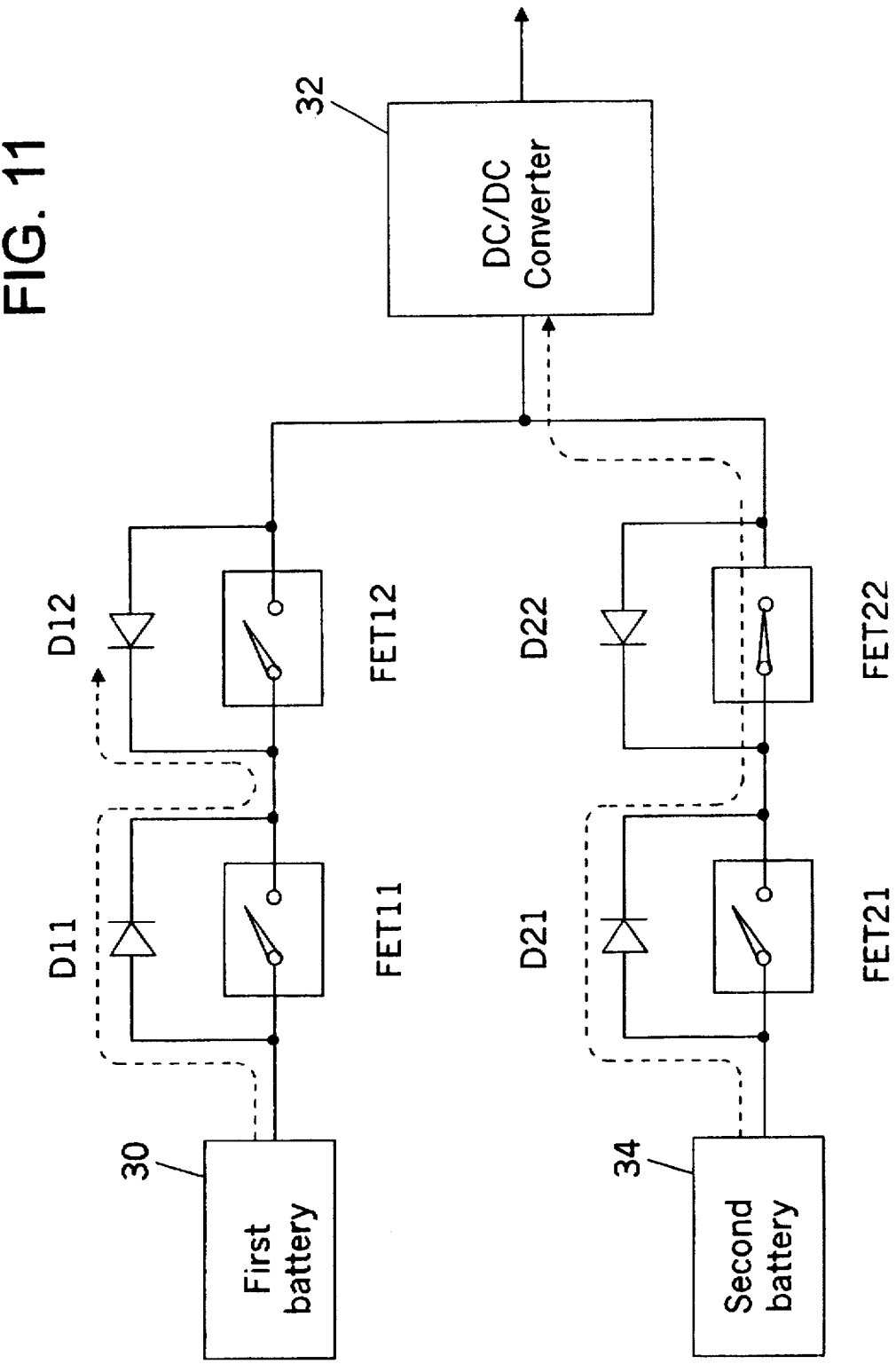
FIG. 11 is a specific diagram showing how power is supplied via an internal diode D21.
Figure 12:
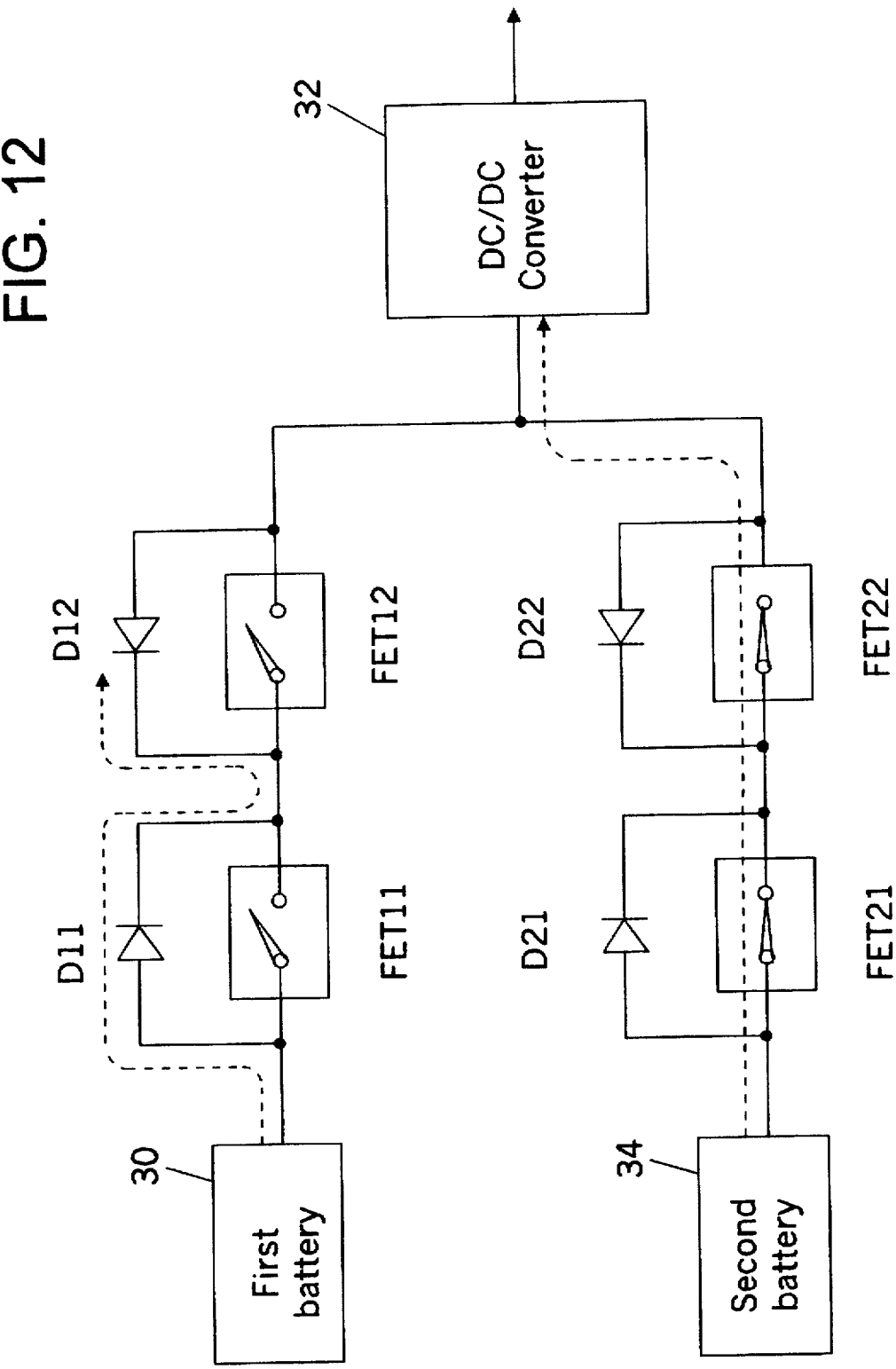
FIG. 12 is a specific diagram showing how power is supplied from a second battery.

If, at step 116A, the second battery pack 34 is being discharged, the FETs 11 and 12 are off and the FETs 21 and 22 are on (FIG. 12). At step 116B, the FET 21 is then turned off. The control signals outputted by the controller 42 are: C11=off, C12=off, C21=off, and C22=on. Consequently, power is supplied from the second battery pack 34 via the internal diode D21 and the drain-source of the FET 22 (FIG. 11).

Figure 10:
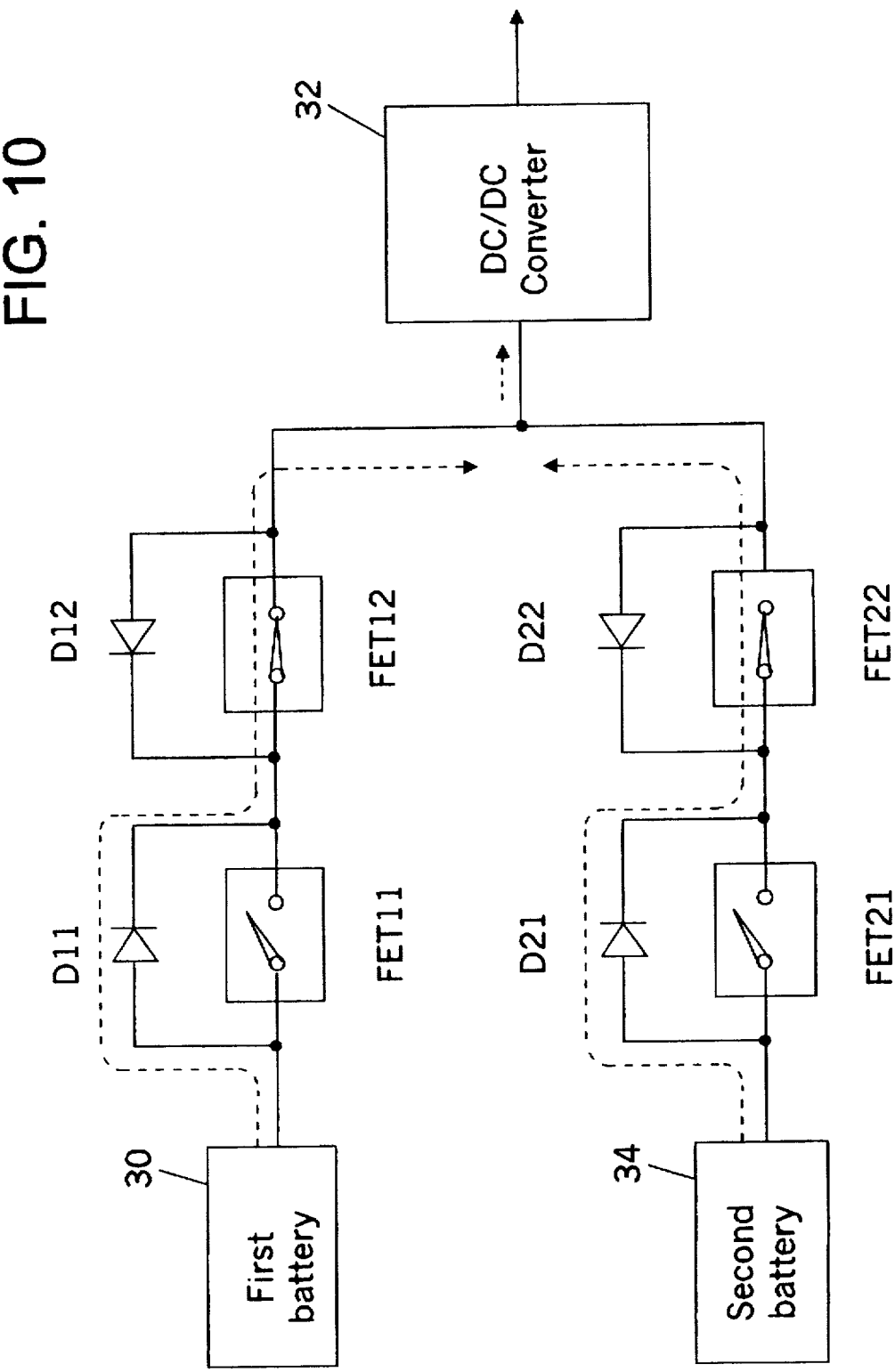
FIG. 10 is a specific diagram showing a diode-OR state.

At step 116C, the FET 12 is turned on. The control signals at this period are: C11=off, C12=on, C21=off, and C22=on. Consequently, the first battery pack 30 and the second battery pack 34 are set to the diode-OR state for the DC/DC converter 32, with power being supplied from the first battery pack 30 via the internal diode D11 and the drain-source of the FET 12, and from the second battery pack 34 via the internal diode D21 and the drain-source of the FET 22 (FIG. 10).

At the next step 116D, the FET 22 is turned off. The control signals at this period are: C11=off, C12=on, C21=off, and C22=off. As a result, the supply of power from the second battery pack 34 is halted by the internal diode D22 and only power from the first battery pack 30 is supplied. At step 116E, the FET 11 is turned on. Then, power from the first battery pack 30 is supplied via the source-drain of the FET 11 and the drain-source of the FET 12, and does not pass through the internal diode D11 of the FET 11 and the internal diode D12 of the FET 12.

Figure 7:
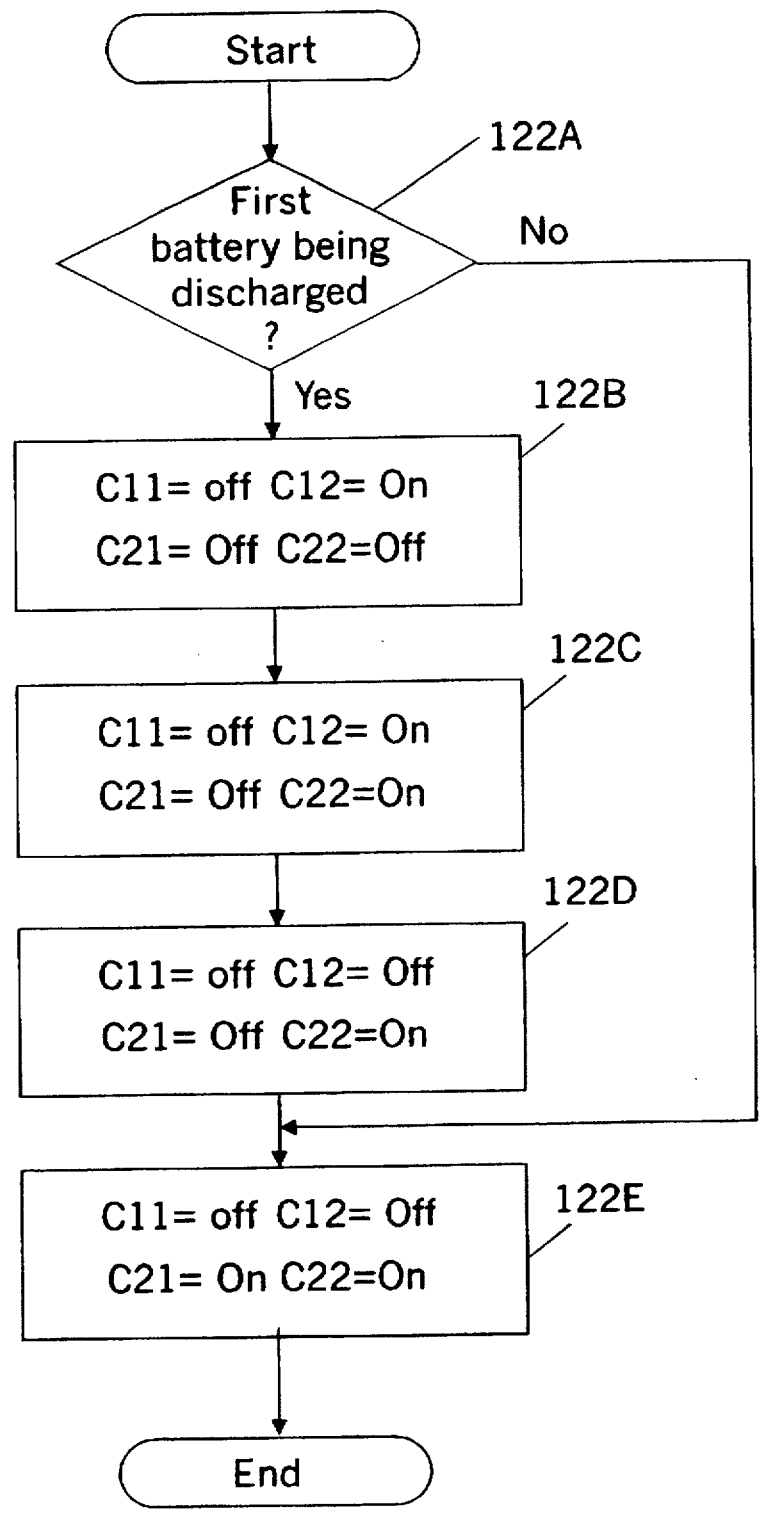
FIG. 7 is a detailed flowchart for the procedure at step 122 in FIG. 5.

FIG. 7 is a detailed flowchart for the procedure at step 122. At step 122A, a check is performed to determine whether or not the first battery pack 30 is being discharged. If the first battery pack 30 is not being discharged, at step 122E the FETs 11 and 12 are turned on and the FETs 21 and 22 are turned off (FIG. 12). Thus, power from the second battery pack 34 is supplied to the computer body without passing through the internal diodes D21 and D22, and the power loss that results from the use of the internal diodes does not occur.

If, at step 122A, the first battery pack 30 is being discharged, the FET 11 is turned off at step 122B, the FET 22 is turned on at step 122C (set to the diode-OR state), the FET 12 is turned off at step 122D, and the FET 21 is turned on at step 122E. The control signals from the controller 42 at this period are shown at steps 122B through 122E in FIG. 7. The battery switching that is performed in consonance with the flowchart in FIG. 7 is illustrated in FIGS. 8 through 12. The state where the first battery pack 30 is being discharged is shown in FIG. 8. FIGS. 9 through 12 correspond to steps 122B through 122E, respectively.

As described above, by switching from the second battery pack 34 to the first battery pack 30, or from the first battery pack 30 to the second battery pack 34, power can be constantly supplied to the computer body. Since this battery switching is performed instantaneously, the power loss that is caused by the internal diodes (D11, D12, D21, and D22) is so small that it can be disregarded.

Figure 13:
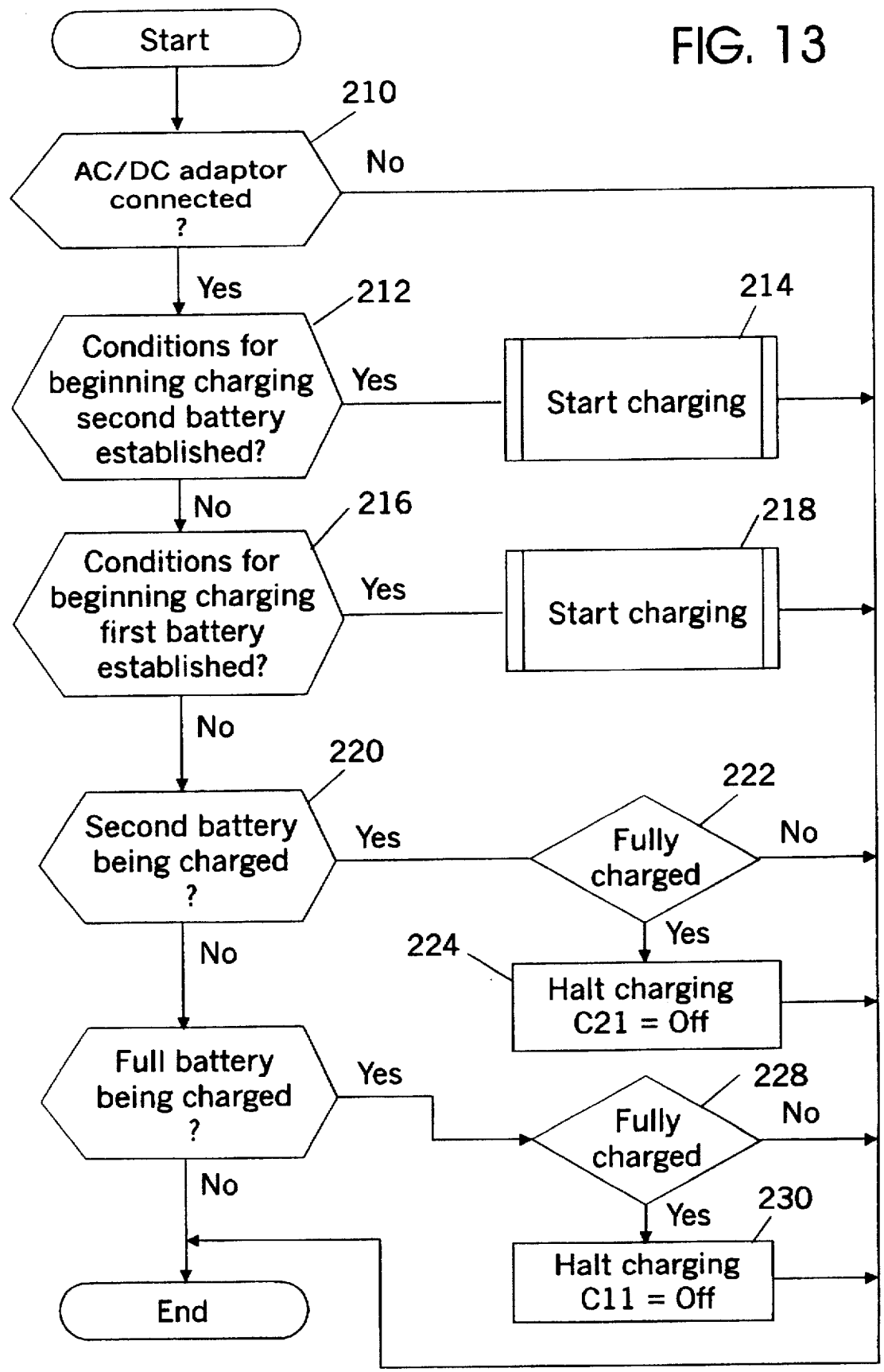
FIG. 13 is a detailed flowchart for the procedure at step 200 in FIG. 5.

FIG. 13 is a detailed flowchart for the procedure at step 200. At step 210, a check is performed to determine whether or not the AC/DC adaptor 36 is connected. When the AC/DC adaptor 36 is not connected, charging cannot be performed. The routine is therefore terminated.

If, at step 210, the AC/DC adaptor 36 is connected, one of the batteries is charged, as will be described later. When this battery is fully charged, the charging of the other battery is begun.

First, at step 212, a check is performed to determine whether or not the charging start condition for the second battery pack 34 is established. For the charging start condition in this case, the battery temperature must be within a predetermined range (for example, 5° C.<battery temperature<43° C.) and the battery voltage is equal to or lower than a battery charge start voltage (which may be the same as the reference voltage V0). When these requirements are satisfied, the charging start condition is established.

When the charging start condition for the second battery pack 34 is established, the charging is begun at step 214, as will be described later. When the charging start condition for the second battery pack 34 is not established, at step 216, a check is performed, by referring to the above described requirements, to determine whether or not the charging start condition for the first battery pack 30 is established. When the charging start condition for the first battery pack 30 is established, the charging is begun at step 218, as will be described later.

At step 220, a check is performed to determine whether or not the second battery pack 34 is being charged. If the second battery pack 34 is being charged, a check is performed at step 222 to determine whether or not the second battery pack 34 has been fully charged. A measured increase in the battery temperature since the beginning of the charging, or the attainment of a specified battery temperature is employed for this determination. When the battery temperature has risen a predetermined number of degrees (e.g., 22° C.) or more since the beginning of the charging, or when the battery temperature reaches a specific value (e.g., 60° C.), the second battery pack 34 is determined to have been fully charged.

When the second battery pack 34 has been fully charged, at step 224 the control signal C21 is output to the gate and the FET 21 is turned off to halt the charging of the second battery pack 34. If, at step 220, the second battery pack 34 is not being charged, a check is performed at step 226 to determine whether or not the first battery pack 30 is being charged. If the first battery pack 30 is being charged, at step 228 a check is performed, by referring to the above described requirements, to determine whether or not the first battery pack 30 has been fully charged. When the first battery pack 30 has been fully charged, the control signal C11 is output to the gate and the FET 11 is turned off, thus halting the charging of the first battery pack 30.

Figure 17:
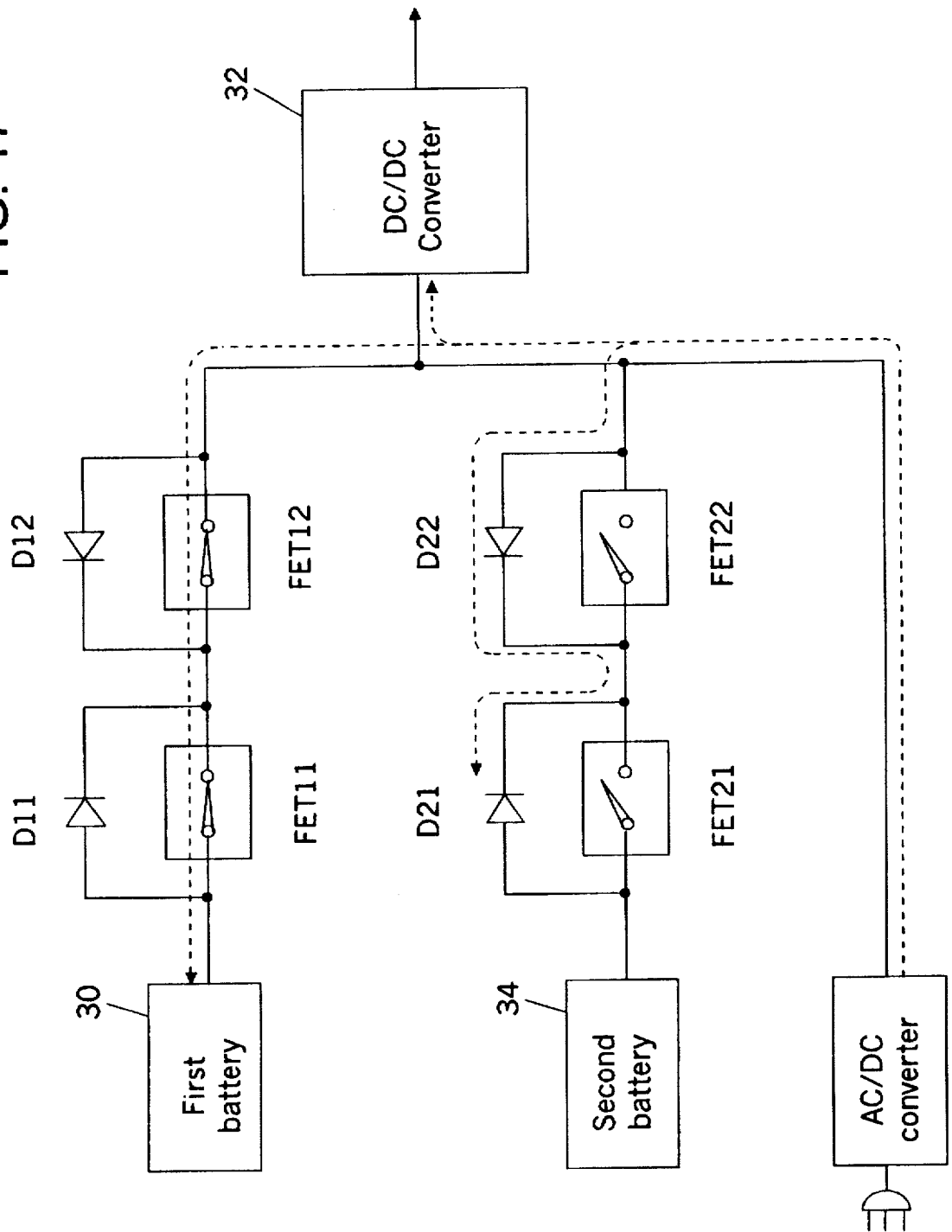
FIG. 17 is a specific diagram showing how an AC/DC converter is connected to the circuit in FIG. 16.
Figure 18:
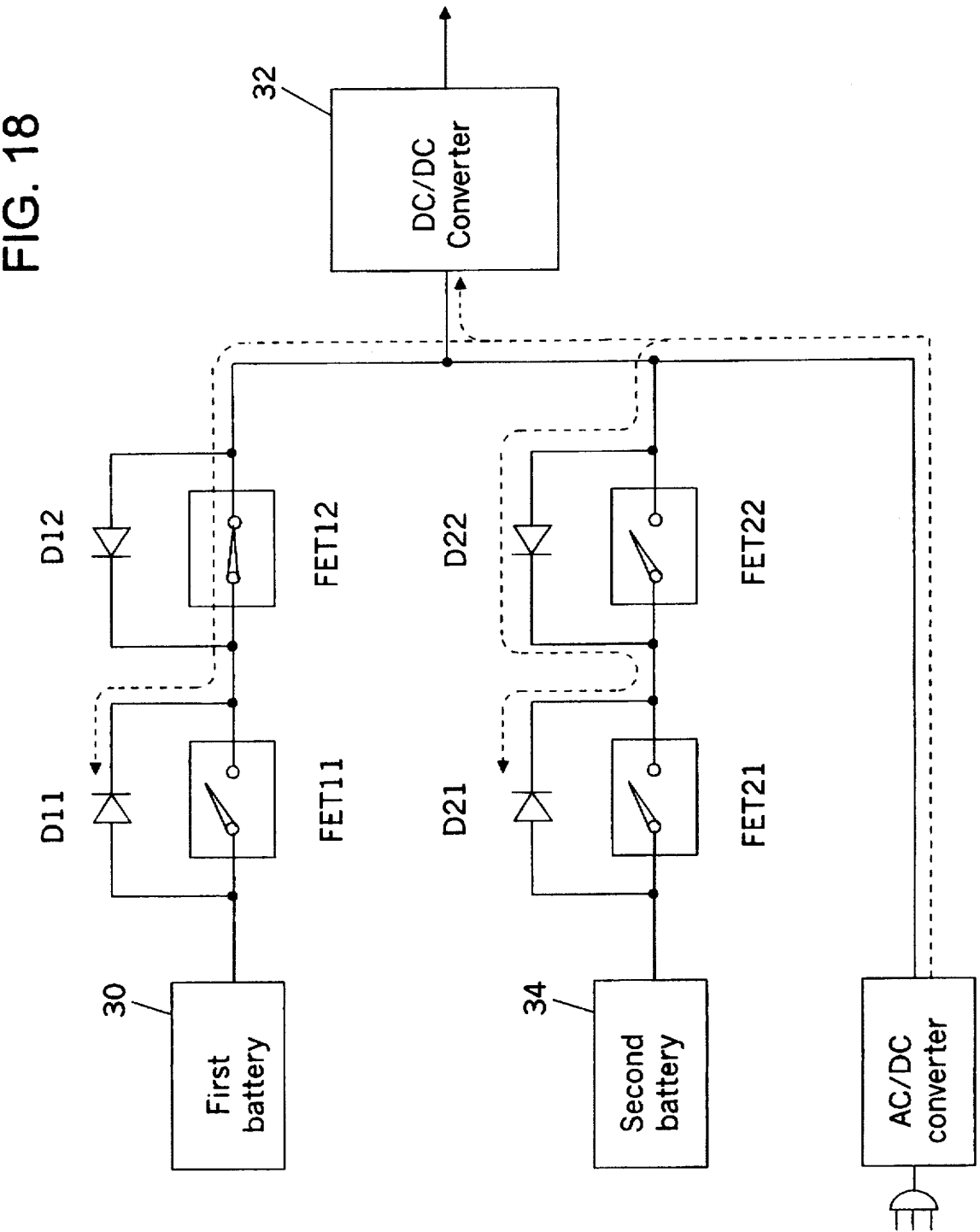
FIG. 18 is a specific diagram showing that an FET 11 is turned off in the circuit shown in FIG. 17.

FIG. 16 is a diagram showing how power is supplied from the first battery pack 30. When the AC/DC adaptor 36 is connected to the circuit in this state, and the charging start condition for the first battery pack 30 is established, the charging for the first battery pack 30 is initiated, as is shown in FIG. 17 (step 218). When the first battery pack 30 is fully charged, the charging for the first battery pack 30 is halted, as is shown in FIG. 18 (step 230).

Figure 14:
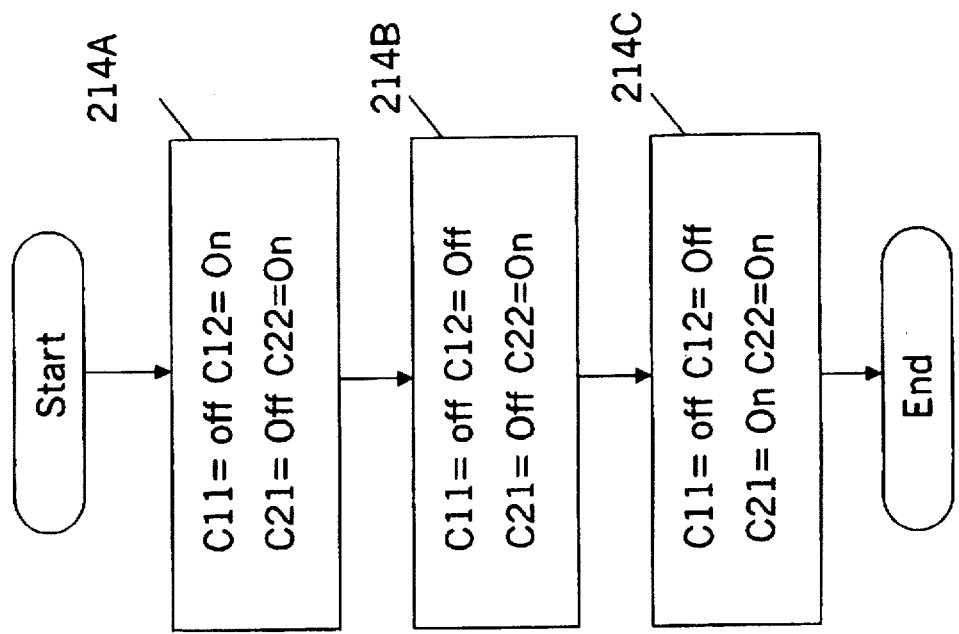
FIG. 14 is a detailed flowchart for the procedure at step 214 in FIG. 13.
Figure 19:
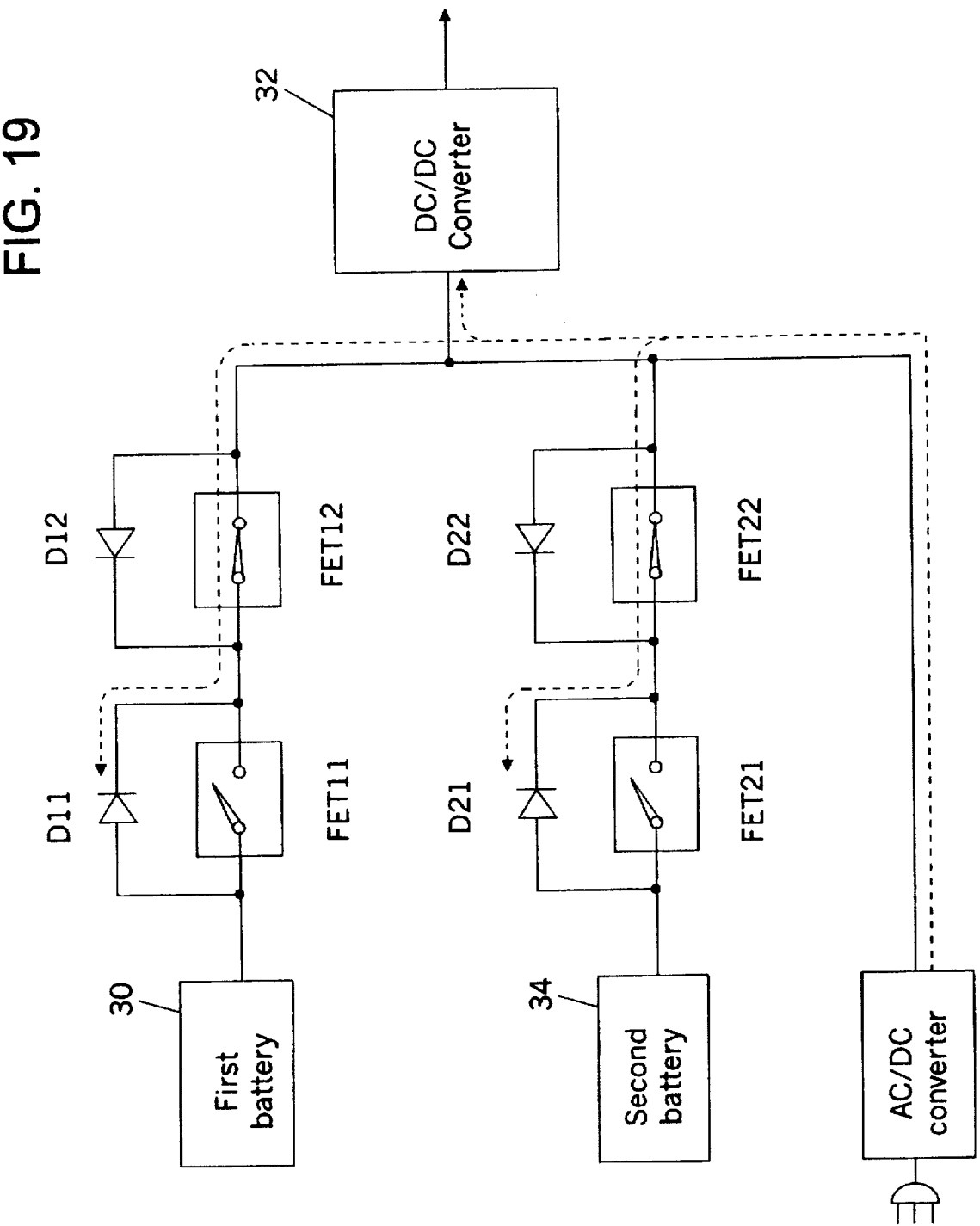
FIG. 19 is a specific diagram showing that an FET 22 is turned on in the circuit shown in FIG. 18.

FIG. 14 is a detailed flowchart for the procedure at step 214 where the second battery pack 34 is to be charged. When the charging start condition for the second battery pack 34 is established, the charging of the first battery pack 30 is completed, and the FET 11 is in the off state, the FET 12 is in the on state, the FET 21 is in the off state, and the FET 22 is in the on state (FIG. 18). Therefore, the FET 22 is turned on at step 214A (FIG. 19), the FET 12 is turned off at step 214B (FIG. 20), and the FET 21 is turned on at step 214C (FIG. 21). The charging for the second battery pack 34 is then begun. It should be noted that, at steps 214A through 214C in FIG. 16, the states of the FETs are described by the ON/OFF control signals C11 through C22 that are carried to the gates.

Figure 15:
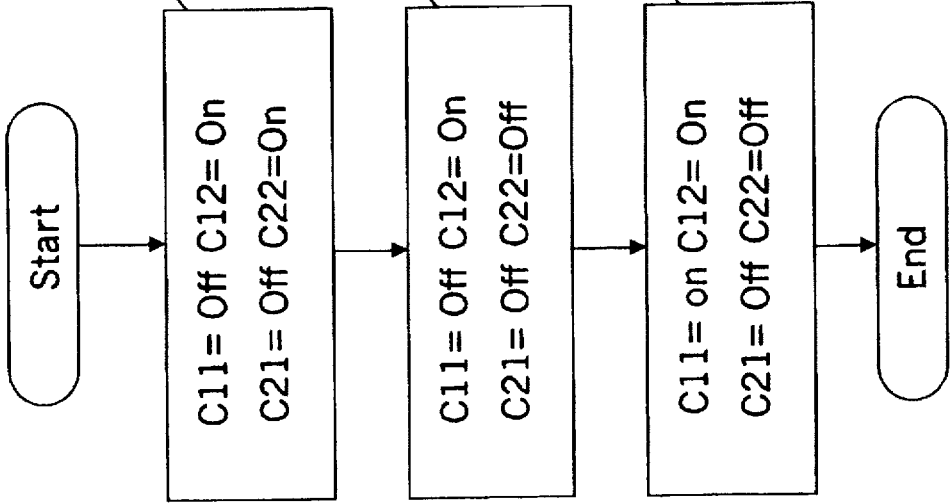
FIG. 15 is a detailed flowchart for the procedure at step 218 in FIG. 13.

FIG. 15 is a detailed flowchart for the procedure at step 218 where the first battery pack 30 is to be charged. When the charging for the second battery pack 34 is halted at step 224, the FETs 11, 12, and 21 are in the off state and the FET 22 is in the on state. Therefore, the FET 12 is turned on at step 218A, the FET 22 is turned off at step 218B, and the FET 11 is turned on at step 218C.

Since, as described above, the charging and the discharging processes are performed by using a common route for the power supply and the charging, a battery connecting device that has a simple structure can be provided.

FIG. 22 is a detailed flowchart for the procedure at step 300. At step 310, a check is performed to determine whether or not the keyboard was opened in consonance with a signal from the keyboard switch, i.e., whether or not a previous notice that a battery is to be removed was issued. When the keyboard is opened, it is assumed that a previous notice has been issued. At step 312, therefore, the first battery pack 30 and the second battery pack 34 are set to the diode-OR state with respect to the DC/DC converter 32. More specifically, to supply power from the first battery pack 30, the FET 11 is turned off and the FET 22 is turned on. To supply power from the second battery pack 34, the FET 21 is turned off and the FET 12 is turned on. Even if one of the batteries is removed, power can be supplied from the remaining battery. Although at this period power is to be supplied via the diode, the replacement of a battery can be completed within a short period of period and there is therefore very little power loss.

Then, at step 314, a check is performed to determine whether or not the keyboard has been closed. When the keyboard is closed, the routine is terminated.

Although in this embodiment the batteries are connected individually to two series circuits, three or more series circuits may be employed and the batteries may be connected to each of the series circuits. Further, although the FETs are employed as switching elements, other switching elements, such as transistors or relays, may be employed. In addition, although the issuance of the previous notice for battery removal is detected upon the opening of the keyboard, the issuance of such a previous notice may be detected by determining whether the battery capacity is equal to or lower than a predetermined value.

Moreover, although the FET employed in this embodiment has a diode which has its anode connected to the source of the FET and its cathode connected to the drain, the present invention is not limited to the thus arranged FET, and an FET where the cathode of a diode is connected to the source may be used.

As described above, the power loss that is caused by diodes can be eliminated and the operating period when using a battery can be extended.

According to the present invention, the operating period for a battery can be extended, and batteries that are being discharged can be switched without halting the power supply when the capacity of one of the batteries is decreased.

According to the present invention, since a route for the power supply is a common route that is also used for charging, a battery connecting device that has a simple structure can be provided and batteries that are being charged can be smoothly switched.

According to the present invention, since the battery connecting device is in the diode-OR state when a previous notice that indicates a battery is to be removed is detected, the operating period for a battery can be extended, and halting of the power supply, which is ascertained by the removal of a battery, can be prevented.

I claim:

1. A battery powered electrical appliance, comprising:
   an electrical apparatus;
   first and second batteries for powering said electrical apparatus;
   first and second switching devices, each of said first and second switching devices having at least three terminals, a first terminal of said first switching device being coupled to said first battery, a second terminal of said first switching device being coupled to a first terminal of said second switching device, a second terminal of said second switching device being coupled to said electrical apparatus;

first and second diodes, each one of said first and second diodes being coupled between said first and second terminals of a unique one of said first and second switching devices;

third and fourth switching devices, each of said third and fourth switching devices having at least three terminals, a first terminal of said third switching device being coupled to said second battery, a second terminal of said third switching device being coupled to a first terminal of said fourth switching device, a second terminal of said fourth switching device being coupled to said electrical apparatus;

third and fourth diodes, each one of said third and fourth diodes being coupled between said first and second terminals of a unique one of said third and fourth switching devices; and a control circuit having four outputs for individually controlling each of said switching devices, each of said outputs being coupled to a third terminal of a unique one of said switching devices, said control circuit for selectively coupling said first and second batteries to said electrical apparatus, said control circuit having a first mode of operation wherein said first battery is coupled to said electrical apparatus through said first and second switching devices, said control circuit having a second mode of operation wherein said second battery is coupled to said electrical apparatus through said third and fourth switching devices, said control circuit having an intermediate mode of operation wherein both said first and second batteries are "OR" coupled to said electrical apparatus through said first and third diodes.

2. The battery powered electrical appliance of claim 1, wherein said intermediate mode of operation is momentarily selected when said control circuit switches from said first to said second modes of operation, thereby preventing any momentary loss of power to said electrical apparatus.

3. A battery powered electrical appliance, comprising:

an electrical apparatus;

first and second batteries for powering said electrical apparatus, said batteries being removably attached to said electrical appliance;

a door covering said batteries, said door having open and closed positions, said door preventing the removal of said batteries when said door is in said closed position;

a door switch coupled to said door, said door switch having first and second positions, said door switch being in said first position when said door is closed, said door switch being in said second position when said door is open;

first and second switching devices, each of said first and second switching devices having at least three terminals, a first terminal of said first switching device being coupled to said first battery, a second terminal of said first switching device being coupled to a first terminal of said second switching device, a second terminal of said second switching device being coupled to said electrical apparatus;

first and second diodes, each one of said first and second diodes being coupled between said first and second terminals of a unique one of said first and second switching devices;

third and fourth switching devices, each of said third and fourth switching devices having at least three terminals, a first terminal of said third switching device being coupled to said second battery, a second terminal of said third switching device being coupled to a first terminal of said fourth switching device, a second terminal of said fourth switching device being coupled to said electrical apparatus;

third and fourth diodes, each one of said third and fourth diodes being coupled between said first and second terminals of a unique one of said third and fourth switching devices; and a control circuit having four outputs for individually controlling each of said switching devices, each of said outputs being coupled to a third terminal of a unique one of said switching devices, said control circuit for selectively coupling said first and second batteries to said electrical apparatus, said control circuit having an intermediate mode whereupon both said first and second batteries are "OR" coupled to said electrical apparatus through said first and third diodes, said control circuit having an input coupled to said door switch, said intermediate mode being selected when said door is open and said door switch is in said second position, such that either one of said first and second batteries can be removed from said electrical appliance without interrupting the flow of power into said electrical apparatus.

* * * * *